Patented May 2, 1933

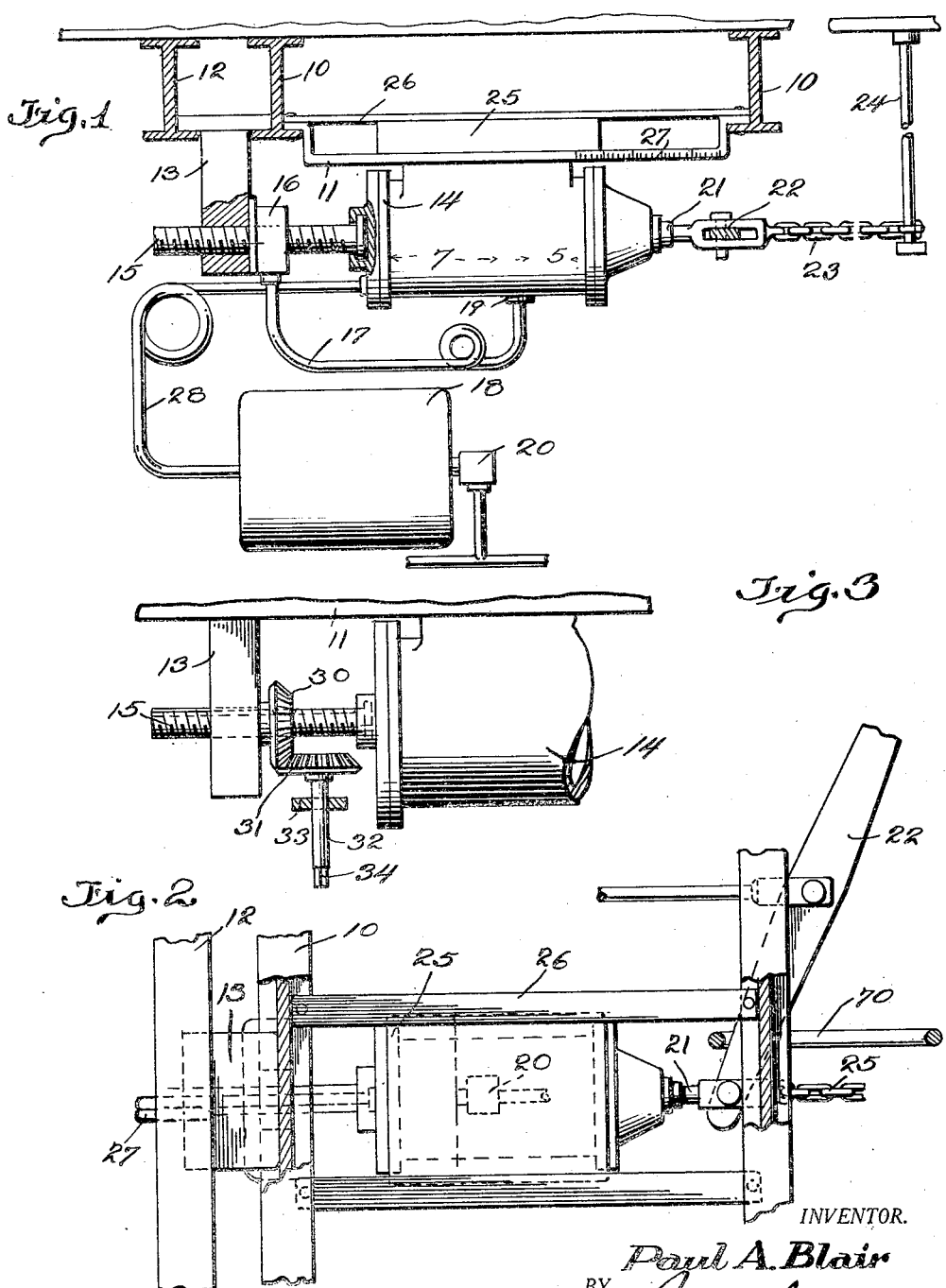

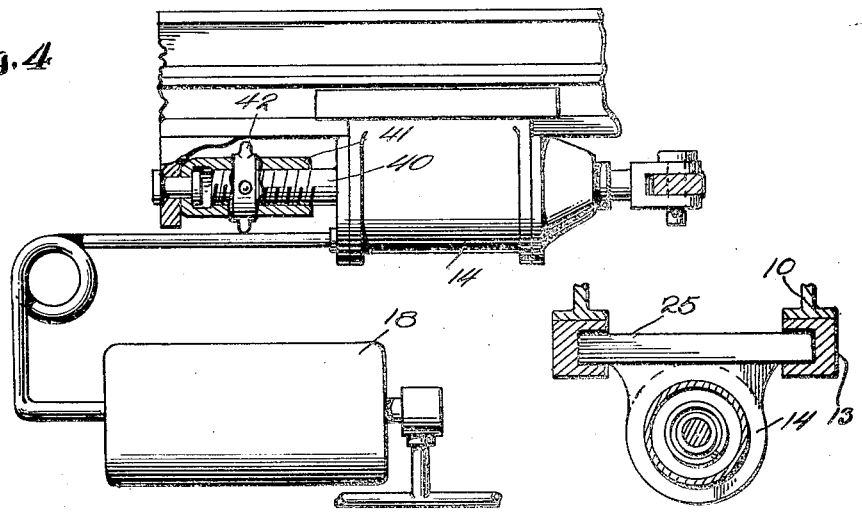
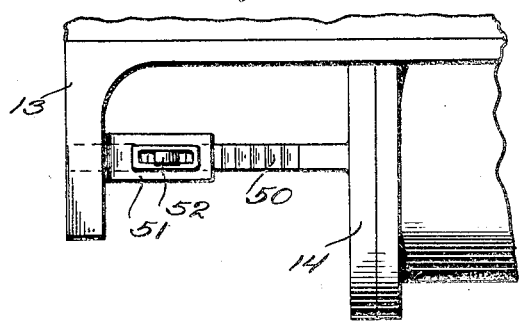
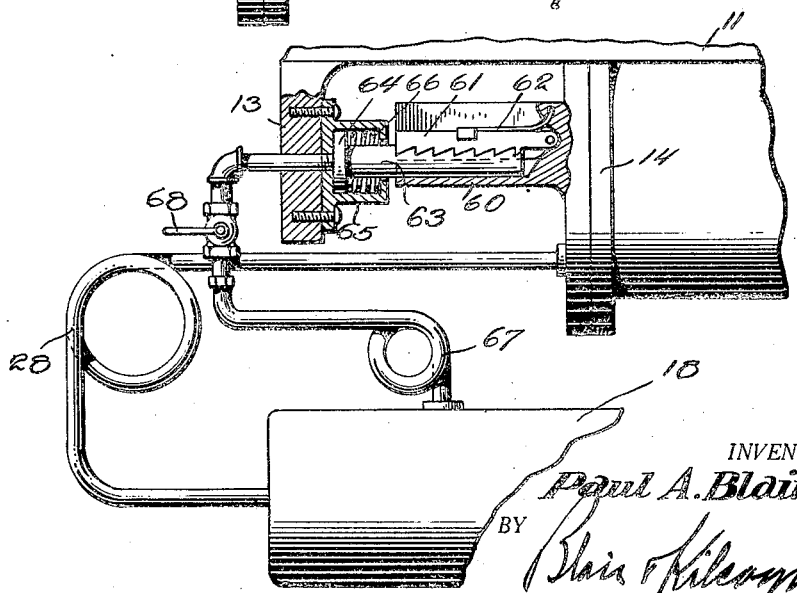

1,907,174

UNITED STATES PATENT OFFICE

PAUL A. BLAIR, OF WASHINGTON, DISTRICT OF COLUMBIA

REGULATOR FOR BRAKE RIGGING

Application filed March 3, 1930. Serial No. 432,961.

This invention relates to regulators for the brake rigging of railway cars.

Conducive to a clearer understanding of the invention, it may be stated that it has long been known that irregular piston travel and abnormal brake shoe clearance have been the primary causes of many serious railroad accidents, and since the beginning of the use of air brakes on railway cars, various devices, both automatic and manual, have been devised for the purpose of establishing and maintaining uniform piston travel thereby to insure desired brake shoe clearance, or conversely, regulating brake shoe clearance and thereby to obtain normal piston travel. These various mechanisms have been applied to one or more fulcrum points and lever connections in the foundation brake rigging or in the linkage, the effective length of which is changed as circumstances require. Some of these mechanisms have been extremely costly in manufacture and assembly on the car.

Also, as known to those familiar with the art, in all practical constructions now in use on railway cars, the air brake cylinder has been rigidly secured to the car under framing, and as piston travel increased, one or more devices as above mentioned were actuated to restore the piston travel to normal, but so far as known, no attempt has been made to move the cylinder with respect to the car framing in a definite manner for the purpose of restoring the piston travel to normal. Thus, if the piston has an excess travel of two inches towards the right on its application movement, instead of shifting various parts of the brake rigging to bring the piston travel back to normal, the cylinder is bodily adjusted two inches to the right in any desired manner whereby on the next application of the brakes, the piston travel will be normal. Obviously such movement of the cylinder may be accomplished in a variety of ways, either manually or automatically, or by fluid pressure, or a combination of these, the principal elements being a cylinder mounted on the car under framing in a manner to permit an adjusting movement with respect to a fixed member and an intervening mechanism for accomplishing the desired movement.

If desired, the intervening mechanism may be provided with a lost motion device equal or proportional to normal piston travel whereby during actuation, the cylinder with its piston may be moved until the brake shoes are against the wheels, after which the cylinder is restored the extent of lost motion and on application desired piston travel will result. Also, the device is applicable in combination with various stop devices such as shown in several patents to William H. Sauvage, such as No. 1,612,781, dated December 28, 1926, and No. 1,753,133, dated April 1, 1930, for example, in which the initial position of the levers is determined or wherein telescopic pistons having a predetermined and intended short travel are employed.

With this brief analysis of the invention, it may be stated that one of the main objects thereof is to provide a simple and practical mechanism of the above nature, which may be inexpensively manufactured, assembled and installed on railway cars with a minimum amount of substitution, alteration or replacement in present day standard equipment.

Other objects will be in part obvious from the annexed drawings and in part hereinafter indicated in connection therewith by the following analysis of this invention.

This invention accordingly consists in the features of construction, combination of parts and in the unique relation of the members and in the relative proportioning and disposition thereof, all as more completely outlined herein.

To enable others skilled in the art to fully comprehend the underlying features thereof that they may embody the same by the numerous modifications in structure and relation contemplated by this invention, drawings depicting a preferred form of the invention have been annexed as a part of this disclosure, and in such drawings like characters of reference denote corresponding parts throughout all of the views, in which—

Fig. 1 is a semi-diagrammatic view of such parts of the car frame and brake rigging, together with a pneumatic step by step automatic regulator, as are necessary to understand the invention;

Fig. 2 is a plan view of such parts;

Fig. 3 is a detail plan view showing one form of manual regulator with remote point of operation;

Fig. 4 is a view similar to Fig. 1 showing a modified manual regulator;

Fig. 5 is a detail transverse sectional view showing one form of cylinder suspension;

Fig. 6 is a detail showing a further modification of manual regulator;

Fig. 7 is a detail showing a combined manual and fluid pressure regulator.

In Fig. 1 there is illustrated a part of the under framing of the car body, which consists of a plurality of transverse I-beams 10 common in steel car construction. Usually the cylinder is bolted directly to brackets 11 connecting these beams, but as herein shown the cylinder is free to move along these brackets. As illustrated, there is supported from adjacent beams 10, 12, a fixed abutment 13 sufficiently strong to absorb the reactive pressure of an emergency air brake application, and between this abutment and the cylinder head 14 is a heavy threaded member 15 and an automatic fluid actuated member 16 similar to the standard Westinghouse step by step regulator, now in use on passenger cars (see Wahlert, No. 696,522, dated April 1, 1902), for moving the threaded member 15 and cylinder 14 towards the right one step each time excess travel occurs or when the piston uncovers a port 19 in the side wall at the end of the flexible pipe 17 leading therefrom to the regulator. Of course, the air reservoir 18 and triple valve 20 would be fixed on the car body and flexibly connected with the cylinder in any desired way as by means of armored hose or flexible or telescopic pipes whereby the relative movement may take place and yet prevent train pipe leakage.

The cylinder is, of course, provided with a telescopic piston 21 at the end of which is pivotally mounted one end of the live cylinder lever 22. Also a chain 23 connects this piston rod with hand brake mechanism 24 of any desired type.

The cylinder 14 is provided with an attaching plate 25 which, instead of being mounted directly on the car frame and bolted thereto as heretofore, slides along the bracket 11 and is held against vertical movement by reason of bars 26 positioned immediately thereabove. It will also be noted that one of these bars, preferably the bar 11, is provided with a scale 27 whereby the exact adjusting movement may be more easily determined.

From the above it will be seen that on initial installation with new brake shoes, the cylinder is moved to the extreme left of the bracket 11, this being permitted by reason of the actuating mechanism 16 which is of that type shown in the Sauvage patent above mentioned, for example. Whenever the piston head moves beyond its predetermined normal travel, usually seven inches standing travel and eight inches running travel, then the port 19 in the side wall of the cylinder is uncovered, allowing a portion of the high pressure air in the cylinder to pass thru the pipe 17 to the actuator 16 thereby to cause a partial rotation of the threaded member 15 and move the cylinder bodily along the supporting brackets 11. Thus an automatic take up of excess travel is accomplished, and unless excess travel of the piston does occur, there will of course be no operation of the actuator 16.

As above stated, the pipe 17 as well as the pipe 28 leading from the auxiliary reservoir 18 to the back of the cylinder is of such character as to permit this relative movement of the cylinder with respect to the auxiliary reservoir when these parts are separately mounted as is usually the case on Pullman cars; great care must be taken to avoid train pipe leakage or leakage in the connection between the reservoir and the cylinder. Consequently, it is preferred to use a flexible metallic pipe or one provided with a spiral which will permit this relative movement, and at the same time reduce pipe connections to a minimum.

In Fig. 3, there is shown a detail of construction in which the car framing cylinder support and other actuating parts are substantially the same as that above described, except that in this case the regulator is manually actuated from a relatively remote point. As herein shown, the cylinder 14 is provided with the same type of rotary threaded member 15 passing thru abutment 13, but between the cylinder head and abutment is mounted a beveled gear 30 meshing with a second bevel gear 31 having a shaft 32 mounted in suitable bearings 33 and extending to the car side or end 34 which may be engaged by a separate crank handle and rotated by the inspector, thereby to move the cylinder in either direction as circumstances may require. For instance, if the scale 27 indicates an excess piston travel of two inches, then the crank handle is actuated to rotate the shaft 32 and gearing to move the cylinder 14 bodily towards the right a distance of two inches. Then on the next application of the brakes, the piston travel obviously will be normal.

In Fig. 4, a further modification is shown in which the cylinder 14 is provided with a rearwardly extending threaded member 40 coacting with a rotatable threaded sleeve 41 which may be manually actuated or rotated by means of handles 42, thus to cause the telescoping threaded members to move relative to each other and thereby adjust the cylinder to re-establish piston travel.

In this form, however, the securing plate 25 as shown in Fig. 5, instead of resting on the channel beams 10, is supported by suitable guide members 43 secured in any desired manner to these beams.

In Fig. 6, a further modification is shown in which the cylinder 14 is provided with a ratchet member 50 telescoping within a housing 51 carried by the abutment 13. A handle 52 extends horizontally to one side whereby it may be conveniently grasped by the inspector and operated in exactly the same manner as many of the well known types of automobile jacks, thereby to cause a progressive outward movement of the ratchet 50 with respect to the base 51. It is, of course, to be understood that the other means, such as the reservoir, pipe connections, cylinder levers, etc., are the same as shown in Fig. 1.

In Fig. 7, a still further modification is shown showing a combined manual and fluid pressure actuated device. In this case the cylinder 14 is provided with a rearwardly extending member 60 and a ratchet 61 held by spring 62 in engagement with a ratchet 63 forming the piston rod of piston 64 located within a cylinder 65 and normally urged towards the left by spring 66. This cylinder 65 is secured to the abutment 13 in any desired manner.

The auxiliary reservoir 18 has the same type of flexible connection with the cylinder 14, such as pipe 28, and a second pipe 67 extends from the reservoir 18 to the cylinder 65. A cock or valve 68 is positioned in this pipe whereby when desired it may be turned to permit a quantity of high pressure air to pass from the reservoir 18 to the cylinder 65 and thereby force the piston towards the right to normal position, and the spring 66 will restore the piston rod 63 to its former position, each stroke of the piston being substantially equal to one ratchet tooth. If one stroke is insufficient to restore the normal piston travel, then of course one or more additional applications of the air are made.

The above shows only a few of the various possible modifications of devices adapted to move bodily the cylinder with respect to the car frame for the purpose of restoring piston travel and insuring normal brake shoe clearance. These devices may be actuated automatically, manually, or by fluid pressure, or by a combination of one or more of these, all as herein shown. The mechanism is of simple, practical and reliable construction. The elimination of the rigid and fixed securing means for the cylinder and the maintenance of such condition will, to a large extent, save the cost of installation of the simpler form of regulators. The cylinder is prevented from movement in any direction except when the regulator is actuated, and thus fully complies with the Interstate Commerce rules regarding such installations. The flexible connections between the cylinder and the auxiliary reservoir may be maintained in a more efficient and air-tight manner than those now in use where various elbows and joints are employed. The invention is, therefore, one adapted to accomplish among others all of the objects and advantages herein set forth.

Without further analysis the foregoing will so fully reveal the gist of this invention that others can by applying current knowledge readily adapt it for various applications without omitting certain features that from the standpoint of the prior art, fairly constitute essential characteristics of the generic or specific aspects of this invention, and therefore such adaptations should and are intended to be comprehended within the meaning and range of equivalency of the following claims.

I claim:

1. In combination, a railway car frame, an air brake cylinder mounted thereon to permit relative longitudinal movement, a fixed member, and means cooperating with the cylinder and member adapted on actuation to cause movement of the cylinder thereby to regulate piston travel and brake shoe clearance.

2. In combination, a railway car frame, an air brake cylinder mounted thereon to permit relative longitudinal movement, a fixed member, means cooperating with the cylinder and member adapted on actuation to cause movement of the cylinder thereby to regulate piston travel and brake shoe clearance, and a scale adjacent the cylinder and its piston for easily determining the relative movement to be made to establish normal piston travel.

3. In combination, a railway car frame, an air brake cylinder mounted thereon to permit relative longitudinal movement, a fixed member, means cooperating with the cylinder and member adapted on actuation to cause movement of the cylinder thereby to regulate piston travel and brake shoe clearance, said cylinder having a telescopic piston, and a cylinder lever connected therewith.

4. In combination, a railway car frame, an air brake cylinder mounted thereon to permit relative longitudinal movement, a fixed member, means cooperating with the cylinder and member adapted on actuation to cause movement of the cylinder thereby to regulate piston travel and brake shoe clearance, said cylinder having a telescopic piston, a cylinder lever connected therewith, and stop means for determining the position of said lever.

5. In combination, a railway car frame, an air brake cylinder mounted thereon to permit relative longitudinal movement, a fixed member, means cooperating with the cylinder and member adapted on actuation to cause movement of the cylinder thereby to regulate piston travel and brake shoe clearance, said cylinder having a telescopic piston, a cylinder lever connected therewith, and hand brake mechanism connected with said piston and lever.

6. In combination, a railway car frame, an air brake cylinder mounted thereon to permit relative longitudinal movement, a fixed member, and manually operated means cooperating with the cylinder and member adapted on actuation to cause movement of the cylinder thereby to regulate piston travel and brake shoe clearance.

7. In combination, a railway car frame, an air brake cylinder mounted thereon to permit relative longitudinal movement, a fixed member, and means cooperating with the cylinder and member adapted on actuation to cause movement of the cylinder thereby to regulate piston travel and brake shoe clearance, said means including a threaded member and means to cause a relative rotation with respect to said fixed member.

8. In combination, a railway car frame, an air brake cylinder mounted thereon to permit relative longitudinal movement, a fixed member and manually operated means operable from a remote point cooperating with the cylinder and member and adapted on actuation to cause movement of the cylinder thereby to regulate piston travel and brake shoe clearance.

9. In combination, a railway car frame, an air brake cylinder mounted thereon to permit relative longitudinal movement, a fixed member, and automatically operating means cooperating with the cylinder and member adapted on actuation to cause movement of the cylinder thereby to regulate piston travel and brake shoe clearance, and absorb the excess travel in a step by step manner.

10. In combination, a railway car frame, an air brake cylinder mounted thereon to permit relative longitudinal movement, a fixed member, and means automatically operating on excess travel and cooperating with the cylinder and member adapted on actuation to cause movement of the cylinder thereby to regulate piston travel and brake shoe clearance.

11. In combination, a railway car frame, an air brake cylinder mounted thereon to permit relative longitudinal movement, a fixed member, means cooperating with the cylinder and member adapted on actuation to cause movement of the cylinder thereby to regulate piston travel and brake shoe clearance, a source of fluid pressure, and means connecting said source of fluid pressure with said first mentioned means.

12. In combination, a railway car frame, an air brake cylinder mounted thereon to permit relative longitudinal movement, a fixed member, and means cooperating with the cylinder and member adapted on actuation to cause movement of the cylinder thereby to regulate piston travel and brake shoe clearance, said member comprising a ratchet member.

13. In combination, a railway car frame, an air brake cylinder mounted thereon to permit relative longitudinal movement, a fixed member, means cooperating with the cylinder and member adapted on actuation to cause movement of the cylinder thereby to regulate piston travel and brake shoe clearance, a source of fluid pressure connected with said means, and a manually operated device between the source of fluid pressure and said means whereby the operation of the latter may be manually controlled.

14. In combination, a railway car frame, an air brake cylinder mounted thereon to permit relative longitudinal movement, a fixed member, means cooperating with the cylinder and member adapted on actuation to cause movement of the cylinder thereby to regulate piston travel and brake shoe clearance, a train pipe connected with said means, and a valve in said train pipe for controlling the flow of air to said means.

15. A regulator for brake rigging of railway cars having an air brake cylinder comprising an extensible member having a fixed point of support and adapted to act on said cylinder to move the cylinder longitudinally with respect to said point.

16. A regulator for brake rigging of railway cars having an air brake cylinder comprising an automatically extensible member having a fixed point of support and adapted to act on said cylinder to move the cylinder longitudinally with respect to said point, said member being operable only on excess travel of said piston beyond its normal stroke.

17. In combination, a railway car frame, an air brake cylinder mounted thereon to permit relative longitudinal movement, a fixed member, means cooperating with the cylinder and member adapted on actuation to cause movement of the cylinder thereby to regulate piston travel and brake shoe clearance, a port in the side of said cylinder beyond the normal piston stroke, and means connecting said port with said first-mentioned means.

Signed at Washington, District of Columbia, this 31st day of January, 1930.

PAUL A. BLAIR.